(12) United States Patent
Li et al.

(10) Patent No.: US 11,361,576 B2
(45) Date of Patent: Jun. 14, 2022

(54) SENSOR CIRCUIT FOR GENERATING AND DETECTING ULTRASONIC SENSING SIGNAL, AN ULTRASONIC SENSING DISPLAY APPARATUS

(71) Applicant: BOE Technology Group Co., Ltd., Beijing (CN)

(72) Inventors: Xiufeng Li, Beijing (CN); Yingming Liu, Beijing (CN); Xiaoliang Ding, Beijing (CN); Lijun Zhao, Beijing (CN); Haisheng Wang, Beijing (CN); Yanling Han, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 230 days.

(21) Appl. No.: 16/762,271

(22) PCT Filed: May 21, 2019

(86) PCT No.: PCT/CN2019/087812
§ 371 (c)(1),
(2) Date: May 7, 2020

(87) PCT Pub. No.: WO2020/232632
PCT Pub. Date: Nov. 26, 2020

(65) Prior Publication Data
US 2021/0406497 A1    Dec. 30, 2021

(51) Int. Cl.
*G01S 7/52*    (2006.01)
*G06V 40/13*    (2022.01)
(Continued)

(52) U.S. Cl.
CPC ........ *G06V 40/1306* (2022.01); *G01S 7/5202* (2013.01); *G01S 7/52025* (2013.01); *G01S 15/8965* (2013.01); *G10K 9/122* (2013.01)

(58) Field of Classification Search
CPC .. G06F 3/0436; G06F 3/0445; G06F 3/04164; G06F 3/0433; G06F 2203/04103;
(Continued)

(56) References Cited

U.S. PATENT DOCUMENTS

2011/0310055 A1* 12/2011 An ...................... H01L 41/0825
 340/407.1
2014/0008203 A1* 1/2014 Nathan ................. G06F 3/0412
 200/600
(Continued)

*Primary Examiner* — Towfiq Elahi
(74) *Attorney, Agent, or Firm* — Intellectual Valley Law, P.C.

(57) ABSTRACT

A circuit for generating and detecting ultrasonic sensing signals is provided. A piezoelectric device having a transmitting electrode and a receiving electrode is coupled to a biasing-and-sampling sub-circuit configured to set different bias voltages to the receiving electrode. The piezoelectric device is configured to transmit an ultrasonic signal upon applying an exciting pulse signal to the transmitting electrode and alternatively to generate a voltage signal at the receiving electrode upon receiving an echo signal based on the ultrasonic signal. A signal-collecting sub-circuit is coupled to the receiving electrode to determine a first sampling voltage based on the voltage signal at the receiving electrode in a first sampling period and a second sampling voltage based on the voltage signal at the receiving electrode in a second sampling period. An output sub-circuit is coupled to the signal-collecting sub-circuit for outputting the first sampling voltage and the second sampling voltage at a same time.

20 Claims, 6 Drawing Sheets

(51) Int. Cl.
*G01S 15/89* (2006.01)
*G10K 9/122* (2006.01)

(58) Field of Classification Search
CPC ............ G06V 40/1365; G06V 40/1306; H01L
41/042; H01L 41/0477; H01L 41/083;
H01L 41/1132; H01L 41/27; G01S
7/5202; G01S 7/52025; G01S 15/8965;
G10K 9/122
See application file for complete search history.

(56) References Cited

U.S. PATENT DOCUMENTS

| | | | | |
|---|---|---|---|---|
| 2016/0042217 A1* | 2/2016 | Kim | ................... | G06V 40/1306 |
| | | | | 382/124 |
| 2016/0163958 A1* | 6/2016 | Park | ..................... | H01L 41/047 |
| | | | | 310/365 |
| 2017/0090028 A1* | 3/2017 | Djordjev | ............. | G01S 7/52079 |
| 2017/0110504 A1* | 4/2017 | Panchawagh | ......... | H01L 41/311 |
| 2017/0262099 A1* | 9/2017 | Nathan | ................. | G06F 3/0443 |
| 2019/0102045 A1* | 4/2019 | Miranto | ................ | G01S 7/5202 |
| 2021/0297059 A1* | 9/2021 | Schiek | ................... | H03H 9/205 |

\* cited by examiner

SENSOR CIRCUIT FOR GENERATING AND DETECTING ULTRASONIC SENSING SIGNAL, AN ULTRASONIC SENSING DISPLAY APPARATUS

CROSS-REFERENCE TO RELATED APPLICATION

This application is a national stage application under 35 U.S.C. § 371 of International Application No. PCT/CN2019/087812, filed May 21, 2019, the contents of which are incorporated by reference in the entirety.

TECHNICAL FIELD

The present invention relates to display technology, more particularly, to a sensor circuit for generating and detecting ultrasonic sensing signal, and an ultrasonic sensing display apparatus.

BACKGROUND

Fingerprint sensor or detector has been widely applied as a way for convenient and safe identity verification. Such sensors based on piezoelectric-induced ultrasonic effect have extensively explored in application on mobile devices. In general, the piezoelectric ultrasonic fingerprint sensor works by utilizing piezoelectric and inverse piezoelectric effects of piezoelectric materials to detect reflection differences of ultrasonic echo signals from fingerprint ridge to fingerprint valley at a glass surface and achieve fingerprint mapping based on the detected reflection differences. For implementing an array of fingerprint sensors to a large-dimension planar device, for example, a display panel, each sensor unit is coupled with a respective one pixel circuit to independently use a piezoelectric device to convert an ultrasonic signal to an electrical signal entering the respective pixel circuit, achieving collection, store, and transmit corresponding DC components of the electrical signals. While, improvement is needed for implementing a sensor array that can minimize or eliminate affections of circuit noises and variations in reference signals.

SUMMARY

In an aspect, the present disclosure provides a circuit for generating and detecting ultrasonic sensing signals. The circuit includes a piezoelectric device having a transmitting electrode and a receiving electrode. The circuit further includes a biasing-and-sampling sub-circuit configured to set different bias voltages to the receiving electrode. The piezoelectric device is configured to transmit an ultrasonic signal upon applying an exciting pulse signal to the transmitting electrode or to generate a voltage signal at the receiving electrode upon receiving an ultrasonic echo signal based on the ultrasonic signal. Additionally, the circuit includes a signal-collecting sub-circuit coupled to the receiving electrode to determine a first sampling voltage based on the voltage signal at the receiving electrode in a first sampling period to be passed out under control of a first control signal and a second control signal and determine a second sampling voltage based on the voltage signal at the receiving electrode in a second sampling period to be passed out under control of the first control signal and a third control signal. Furthermore, the circuit includes an output sub-circuit coupled to the signal-collecting sub-circuit for outputting the first sampling voltage and the second sampling voltage at a same time.

Optionally, the biasing-and-sampling sub-circuit includes a diode having a first terminal coupled to the receiving electrode and a second terminal coupled to a bias-voltage terminal. The biasing-and-sampling sub-circuit also includes a reset transistor having a control terminal coupled to a reset terminal, a first terminal coupled to the receiving electrode, and a second terminal coupled to the bias-voltage terminal. The reset terminal is provided with a reset signal and the bias-voltage terminal is provided with a bias voltage.

Optionally, the biasing-and-sampling sub-circuit consists of a reset transistor having a control terminal coupled to a reset terminal, a first terminal coupled to the receiving electrode, and a second terminal coupled to the bias-voltage terminal. The reset terminal is provided with a reset signal and the bias-voltage terminal is provided with a bias voltage. The reset signal is substantially equal in value with the bias voltage in at least the first sampling period and the second sampling period.

Optionally, the signal-collecting sub-circuit includes a first transistor having a control terminal coupled to the receiving electrode carrying the voltage signal, a first terminal coupled to a middle-stage port, and a second terminal coupled to a power supply port. Additionally, the signal-collecting sub-circuit includes a second transistor having a control terminal configured to receive the first control signal, a first terminal coupled to a ground port, and a second terminal coupled to the middle-stage port. Furthermore, the signal-collecting sub-circuit includes a third transistor having a control terminal configured to receive a second control signal, a first terminal including a first parasitic capacitor, and a second terminal coupled to middle-stage port. Moreover, the signal-collecting sub-circuit includes a fourth transistor having a control terminal configured to receive the third control signal, a first terminal including a second parasitic capacitor, and a second terminal coupled to the middle-stage port.

Optionally, the first transistor is biased by the voltage signal generated at the receiving electrode and stored in a parasitic capacitor connected to the receiving electrode. The voltage signal is related to the ultrasonic echo signal which has a detectable strength in the first sampling period and substantially is decayed in the second sampling period. The second transistor and the third transistor are turned on together respectively by the first control signal and the second control signal in the first sampling period for passing the first sampling voltage related to the ultrasonic echo signal and a circuit-reference signal through the middle-stage port to the first parasitic capacitor. The second transistor and the fourth transistor are turned on together respectively by the first control signal and the third control signal in the second sampling period for passing the second sampling voltage related only to the circuit-reference signal through the middle-stage port to the second parasitic capacitor.

Optionally, the output sub-circuit includes a fifth transistor and a sixth transistor having a common control terminal configured to receive a fourth control signal. The fifth transistor has a drain terminal coupled to the first parasitic capacitor and the sixth transistor has a drain terminal coupled to the second parasitic capacitor. The fifth transistor and the sixth transistor are configured, under control of the fourth control signal, to output the first sampling voltage from the first parasitic capacitor to a source terminal of the fifth transistor and at a same time to output the second sampling voltage from the second parasitic capacitor to a source terminal of the sixth transistor.

Optionally, each of the first, second, third, fourth, fifth, and sixth transistor is an N-type transistor.

Optionally, the piezoelectric device includes a piezoelectric material selected from a polymer film containing polyvinylidene fluoride, a piezoelectric ceramic containing lithium niobate, gallium arsenide, zinc oxide, aluminum nitride and lead zirconate-titanate (PZT), an electromechanical film containing thin polypropylene material.

Optionally, the receiving electrode includes a thin film block made by indium tin oxide.

Optionally, the circuit further includes an operational amplifier configured to receive the first sampling voltage and the second sampling voltage as a differential signal to output a sensing voltage signal related to the ultrasonic echo signal yet independent of the circuit-reference signal.

In another aspect, the present disclosure provides an ultrasonic sensing signal detection circuit for generating an ultrasonic sensing pixel image. The ultrasonic sensing signal detection circuit includes a piezoelectric device having a transmitting electrode and a receiving electrode. The ultrasonic sensing signal detection circuit further includes a biasing-and-sampling sub-circuit configured to set different bias voltages to the receiving electrode respectively for the piezoelectric device to transmit an ultrasonic signal upon applying an exciting pulse signal to the transmitting electrode and to generate a voltage signal at the receiving electrode upon receiving an ultrasonic echo signal based on the ultrasonic signal. Additionally, the ultrasonic sensing signal detection circuit includes a signal-collecting sub-circuit coupled to the receiving electrode to determine a first sampling voltage based on the voltage signal at the receiving electrode to be passed out under control of a first control signal and a second control signal in a first sampling period and determine a second sampling voltage based on the voltage signal at the receiving electrode to be passed out under control of the first control signal and the second control signal in a second sampling period. Furthermore, the ultrasonic sensing signal detection circuit includes a peripheral digital circuit configured to deduce the ultrasonic echo signal received by based on a differential signal between a first digital signal converted from the first sampling voltage and a second digital signal converted from the second sampling voltage.

Optionally, the biasing-and-sampling sub-circuit includes a diode having a first terminal coupled to the receiving electrode and a second terminal coupled to a bias-voltage terminal and a reset transistor having a control terminal coupled to a reset terminal, a first terminal coupled to the receiving electrode, and a second terminal coupled to the bias-voltage terminal. The reset terminal is provided with a reset signal and the bias-voltage terminal is provided with a bias voltage.

Optionally, the signal-collecting sub-circuit includes a first transistor having a control terminal coupled to the receiving electrode carrying the voltage signal, a first terminal coupled to a middle-stage port, and a second terminal coupled to a power supply port. Additionally, the signal-collecting sub-circuit includes a second transistor having a control terminal configured to receive the first control signal, a first terminal coupled to a ground port, and a second terminal coupled to the middle-stage port. Furthermore, the signal-collecting sub-circuit includes a third transistor having a control terminal configured to receive a second control signal, a first terminal being an output port, and a second terminal coupled to middle-stage port.

Optionally, the first transistor is biased by the voltage signal generated at the receiving electrode and stored in a parasitic capacitor connected to the receiving electrode. The voltage signal is related to the ultrasonic echo signal which has a detectable strength in the first sampling period and substantially is decayed in the second sampling period. The second transistor and the third transistor are turned on together respectively by the first control signal and the second control signal in the first sampling period for passing the first sampling voltage related to the ultrasonic echo signal and a circuit-reference signal through the middle-stage port to output port and in the second sampling period for passing the second sampling voltage related only to the circuit-reference signal through the middle-stage port to the output port.

Optionally, the peripheral digital circuit includes an analog-to-digital converter configured to convert the first sampling voltage to the first digital signal and convert the second sampling voltage to a second digital signal. The peripheral digital circuit also includes comprises a non-volatile memory to store the first digital signal and the second digital signal. Further, the peripheral digital circuit includes a processor to deduce a pixel data signal corresponding to the ultrasonic echo signal based on a differential signal between the first digital signal and the second digital signal.

Optionally, the peripheral digital circuit is coupled to a pixel circuit. The pixel data signal is inputted for driving the pixel circuit to display a pixel image.

Optionally, the piezoelectric device is configured to transmit an ultrasonic signal upon receiving an exciting pulse signal at the transmitting electrode with one or more voltage pulses in a frequency of 5~30 MHz.

In yet another aspect, the present disclosure provides a sensing display apparatus including a display panel having a top screen over a glass substrate including an array of pixel circuits. A respective one of the array of pixel circuits is coupled to a respective one of an array of ultrasonic sensing signal detection circuits described herein.

Optionally, the array of the ultrasonic sensing signal detection circuits includes array of piezoelectric devices made by one polymer film containing polyvinylidene fluoride extended across entire substrate with a common transmitting electrode made by a silver layer and array of individual receiving electrodes made by indium tin oxide separated by an insulation material.

Optionally, the array of the ultrasonic sensing signal detection circuits further includes a control-and-transmission circuit configured to provide one or more excitation voltage pulses in a frequency of 5~30 MHz, one or more bias voltages, and one or more control signals. The one or more excitation voltage pulses are applied to the common transmitting electrode and the one or more bias voltages are provided to a respective one of the array of individual receiving electrodes of a respective one of the array of piezoelectric devices under control of the one or more control signals, to generate and transmit a respective ultrasonic signal, and to detect a ultrasonic echo signal reflected by an object touched on the top screen.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

For implementing an array of sensors to a fingerprint imaging apparatus with a large form factor, each sensor is disposed to be associated with each image pixel circuit for directly collect DC components of the sensing signals, store and transform the signals to the image pixel for display sensed fingerprint image. For the seek of reducing cost and convenience in large-scale integration, the image pixel circuits of the imaging apparatus usually are formed with thin-film transistors (TFTs). However, the TFT-based pixel circuit has issues in reference signal variation, process variation, and affection of noises, which affects the sensor that is coupled with to stably collect the sensing signal.

Figure 1:
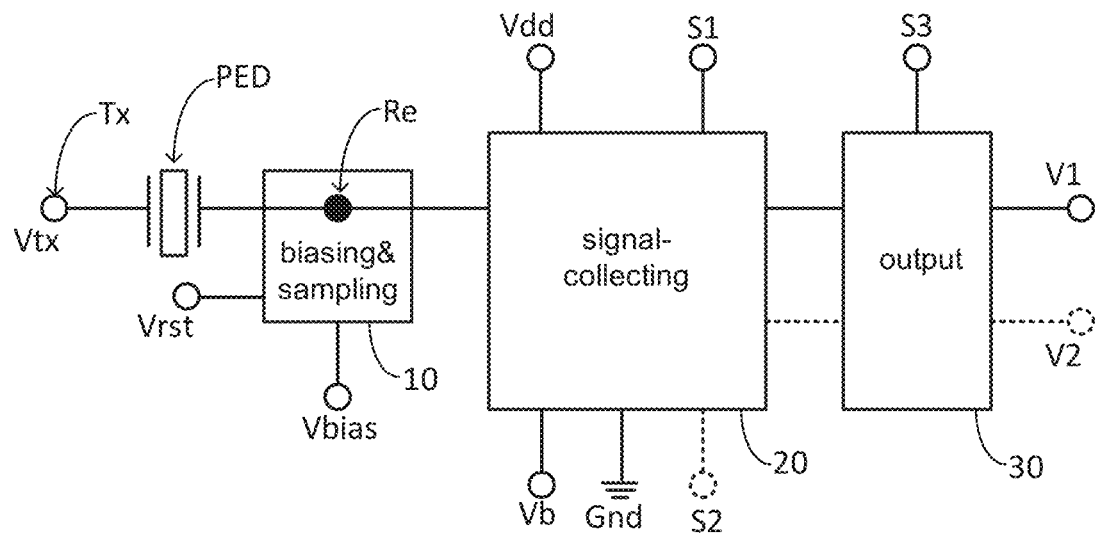
FIG. 1 is a block diagram of a sensor circuit for generating and detecting ultrasonic sensing signals according to some embodiments of the present disclosure.

Accordingly, the present disclosure provides, inter alia, a sensor circuit for generating and detecting ultrasonic sensing signals, a sensing display apparatus having an array of sensor circuits coupled with respective pixel circuits for displaying sensing images that substantially obviate one or more of the problems due to limitations and disadvantages of the related art. In a specific embodiment, a sensing display apparatus based on array of sensor circuits for generating and detecting ultrasonic sensing signals is applied for provide fingerprint image. In one aspect, the present disclosure provides a sensor circuit for generating and detecting ultrasonic sensing signals according to some embodiments. FIG. 1 shows a block diagram of a sensor circuit for generating and detecting ultrasonic sensing signals according to some embodiments of the present disclosure. Referring to FIG. 1, the sensor circuit includes the following basic elements. Firstly, it includes a piezoelectric device PED as a sensor device. The piezoelectric device PED includes a transmitting electrode Tx and a receiving electrode Re. The sensor circuit also includes a biasing-and-sampling sub-circuit 10 coupled to the receiving electrode Re to set different bias voltages thereof.

Optionally, the piezoelectric device PED is an ultrasonic transceiver functioned according to ultrasonic piezoelectric effect. The PED is configured to transmit an ultrasonic signal upon applying an exciting pulse signal Vtx to the transmitting electrode Tx and alternatively to generate a voltage signal at the receiving electrode upon receiving an ultrasonic echo signal based on the ultrasonic signal it initially transmitted. Optionally, the exciting pulse signal Vtx is provided as an AC voltage with multiple sine wave pulses or square wave pulses in frequency of 5-30 MHz. AC voltage makes the PED oscillate at the same frequency and produce an ultrasonic sound wave or signal if the PED is properly biased across its transmitting electrode Tx and receiving electrode Re. As the ultrasonic signal is reflected from an external object, an ultrasonic echo signal in a form of multiple decaying pulses can be detected by the same PED if the transmitting electrode Tx and the receiving electrode Re is properly biased accordingly. The biasing condition of the PED is configured to be properly set by the biasing-and-sampling sub-circuit 10 to set different bias voltages to the receiving electrode Re respectively for the transmission period and for the receiving period. In an embodiment, the biasing-and-sampling sub-circuit 10 is controlled by a reset signal Vrst supplied to a reset terminal to timely apply a proper bias voltage Vbias supplied to a bias-voltage terminal to the receiving electrode to determine a voltage signal there at a respective time period.

Referring to FIG. 1 again, the sensor circuit also includes signal-collecting sub-circuit 20 coupled to the receiving electrode Re to determine a first sampling voltage based on the voltage signal at the receiving electrode Re in a first sampling period to be passed out under control of a first control signal Vb and a second control signal S1 and determine a second sampling voltage based on the voltage signal at the receiving electrode Re in a second sampling period to be passed out under control of the first control signal Vb and a third control signal S2. Optionally, the third control signal S2 is not needed if the signal-collecting sub-circuit 20 is reconfigured to a simplified version.

Further, the sensor circuit includes an output sub-circuit 30 coupled to the signal-collecting sub-circuit 20 for outputting the first sampling voltage and the second sampling voltage at a same time. Optionally, the output sub-circuit 30 is controlled by a fourth control signal S3 to enable the output of the first sampling voltage and the second sampling voltage originally stored in the signal-collecting sub-circuit 20. Optionally, the first sampling voltage is outputted to a first output port V1 and the second sampling voltage is outputted to a second output port V2.

Figure 2:
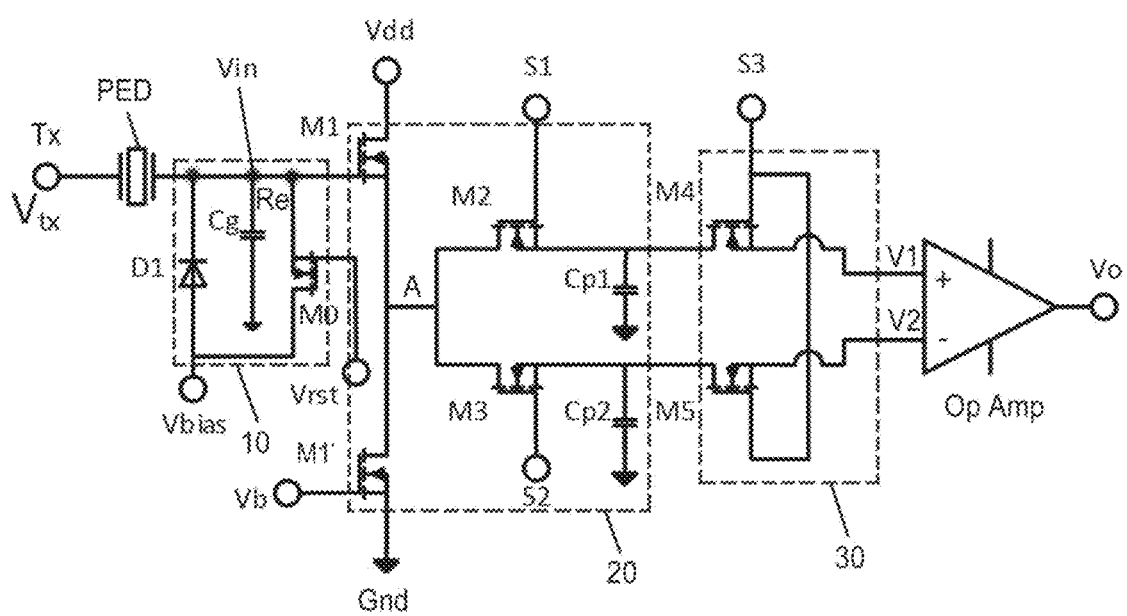
FIG. 2 is a circuit diagram of a sensor circuit for generating and detecting ultrasonic sensing signal according to an embodiment of the present disclosure.

FIG. 2 is a circuit diagram of a sensor circuit for generating and detecting ultrasonic sensing signal according to an embodiment of the present disclosure. Referring to FIG. 2, the sensor circuit is an example of the circuit shown in FIG. 1. In the embodiment, the biasing-and-sampling sub-circuit 10 includes a diode D1 having a first terminal coupled to the receiving electrode Re and a second terminal coupled to a bias-voltage terminal supplying a bias voltage Vbias. Optionally, the bias voltage Vbias is set differently at different time periods depending on application. The biasing-and-sampling sub-circuit 10 also includes a reset transistor M0 having a control terminal coupled to a reset terminal to receive a reset signal Vrst. The reset transistor M0 also has a first terminal coupled to the receiving electrode Re and a second terminal coupled to the bias-voltage terminal to receive the bias voltage supplied thereof. Optionally, the receiving electrode Re that is shared with the first terminal of the diode D1, the first terminal of the reset transistor M0, and a control terminal of a first transistor M1 is comprised of a parasitic capacitor Cg effectively to hold a DC voltage component at a certain time period depended on the bias voltage value and any AC voltage signal induced by external sensing signal such as an ultrasonic echo signal.

In the embodiment, the signal-collecting sub-circuit 20 of the sensor circuit of FIG. 2 is provided with a first transistor M1 having a control terminal coupled to the receiving electrode Re carrying the voltage signal (which is set to Vbias as determined by the biasing-and-sampling sub-circuit 10). The first transistor M1 also has a first terminal coupled to a middle-stage port A and a second terminal coupled to a power supply port supplying a positive voltage Vdd. The signal-collecting sub-circuit 20 includes a second transistor M1' having a control terminal configured to receive the first control signal Vb, a first terminal coupled to a ground port Gnd and a second terminal coupled to the middle-stage port A. The signal-collecting sub-circuit 20 further includes a third transistor M2 having a control terminal configured to receive a second control signal S1, a first terminal including a first parasitic capacitor Cp1, and a second terminal coupled to middle-stage port A. Additionally, the signal-collecting sub-circuit 20 includes a fourth transistor M3 having a control terminal configured to receive the third control signal S2, a first terminal including a second parasitic capacitor Cp2, and a second terminal coupled to the middle-stage port A. Optionally, all these transistors M1, M1', M2, and M3 are N-type transistors, though they can be provided as P-type transistors with proper operation condition changes being set without affecting any outcome described herein of implementing the sensor circuit into a display apparatus for displaying sensor image, such as a fingerprint image.

Further in the embodiment, the sensor circuit includes an output sub-circuit 30 including a fifth transistor M4 and a sixth transistor M5 having a common control terminal configured to receive a fourth control signal S3. The fifth transistor M4 has a drain terminal coupled to the first parasitic capacitor Cp1 and the sixth transistor M5 has a drain terminal coupled to the second parasitic capacitor Cp2. Both of them are configured under control of the fourth control signal S3 to output a first sampling voltage stored in the first parasitic capacitor Cp1 to a source terminal of the fifth transistor M4 and at a same time to output the second sampling voltage stored in the second parasitic capacitor Cp2 to a source terminal of the sixth transistor M5. The source terminal of the fifth transistor M4 is connected to a first output port V1 and the source terminal of the sixth transistor M5 is connected to a second output port V2. Both the fifth transistor M4 and the sixth transistor M6 are N-type transistors for simplifying manufacture process.

The sensor circuit described here, as the piezoelectric device PED is applied an AC excitation signal to the transmitting electrode Tx, can be operated to generate an ultrasonic signal and, subsequently, ready to detect an ultrasonic echo signal, which is converted to a DC voltage signal at the receiving electrode Re if it is properly biased. In an embodiment, the first transistor M1 is biased by the voltage signal Vin generated at the receiving electrode Re and stored in a parasitic capacitor Cg connected to the receiving electrode Re. The voltage signal Vin stored in a parasitic capacitor Cg is related to the ultrasonic echo signal which has a detectable strength in the first sampling period and substantially is decayed in the second sampling period. The second transistor M1' and the third transistor M2 are turned on together respectively by the first control signal Vb and the second control signal S1 in the first sampling period for passing a first sampling voltage related to the ultrasonic echo signal plus a circuit-reference signal through the middle-stage port A to store in the first parasitic capacitor Cp1. The second transistor M1' and the fourth transistor M3 are turned on together respectively by the first control signal Vb and the third control signal S2 in the second sampling period for passing the second sampling voltage related only to the circuit-reference signal through the middle-stage port A to store in the second parasitic capacitor Cp2. A detailed description of the operation scheme is presented below based on the embodiment of the sensor circuit provided in FIG. 2.

Figure 3:
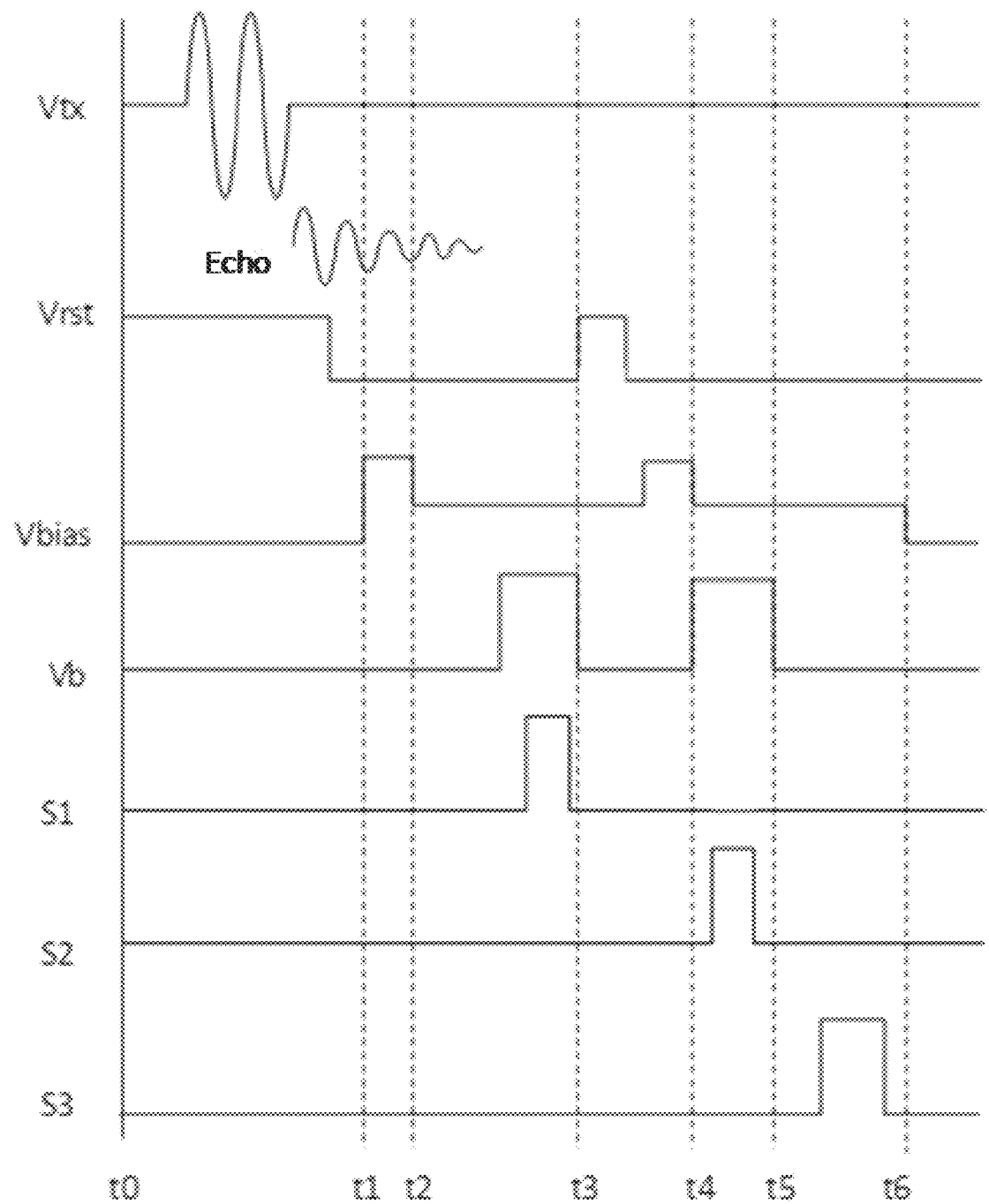
FIG. 3 is a timing diagram of operating the sensor circuit of FIG. 2 to detect an ultrasonic sensing signal according to an embodiment of the present disclosure.

FIG. 3 is a timing diagram of operating the sensor circuit of FIG. 2 to detect an ultrasonic sensing signal according to an embodiment of the present disclosure. Referring to FIG. 3, the operation for generating and detecting sensing signals based on the sensor circuit of FIG. 2 is achieved by properly setting several control signals including reset signal Vrst, bias voltage Vbias, a first control signal Vb, a second control signal S1, a third control signal S2, and a fourth control signal S3 in several timing periods.

In a transmission period between t0 and t1, the reset signal Vrst is set to effective turn-on voltage so that the reset transistor M0 is turned on to allow the bias voltage Vbias to be written to the receiving electrode Re. In this period, Vbias is set to an effective low level to enable the PED to be in a transmission mode. As the transmitting electrode Tx is applied with an AC excitation signal in 5-30 MHz, it substantially enables the PED to oscillate and generate an ultrasonic signal which is transmitted through any physical material, for example, a display panel having multiple layers and a top planar glass cover, where the sensor circuit is disposed. Optionally, the AC excitation signal includes several Sine wave pulses or square wave pulses with pulse number being controlled with 1 to 5. Immediately after the ultrasonic signal is transmitted out, the whole circuit is subjected to certain mechanical oscillation. Some unwanted echo signals may be quickly reflected back from some middle layers of the display panel to cause interference. So, the reset signal Vrst is maintained at the effective turn-on voltage to shut off the receiving mode of the PED to reduce noise levels before changing to an effective turn-off voltage to prepare turning the PED into a receiving mode.

Next, in a receiving period between t1 and t3, a real ultrasonic echo signal may be reflected from an interface between a finger surface and the top glass cover of the display panel served also as a fingerprint imaging apparatus. The bias voltage Vbias, which was initially set at low level to avoid receiving noise, now is raised to a high level in a first sampling period between t1 and t2. The diode D1 thus is set to lock its first terminal connected to the receiving electrode Re above the bias voltage Vbias to generate a DC voltage component while the transmitting electrode Tx is returned to a low level (after the AC excitation signal is shut off), making the PED to be operated in an inverse piezoelectric effect. Therefore, the ultrasonic echo signal can be detected as an AC voltage signal Vecho at the receiving electrode Re. Effectively, a voltage at the receiving electrode Re is at Vin=Vbias+Vecho, which is also connected to a control terminal of the first transistor M1. The DC voltage component of Vin is stored in the parasitic capacitor Cg associated with the control terminal of the first transistor M1 as well as the receiving electrode Re.

After the first sampling period ends at t2, the bias voltage Vbias is tuned to a lower level which still makes the control terminal of the first transistor M1 to be biased properly. Yet, the first control signal Vb and the second control signal S1 are raised to an effective turn-on voltage during the period between t2 and t3. The second transistor M1' is turned on by the first control signal Vb to establish a voltage level at the middle-stage port A which is determined by the bias status of the first transistor M1. Since the third transistor M2 is turned on by setting the second control signal S1 to an effective high level, the voltage level at the middle-stage port A is passed as a first sampling voltage through the third transistor M2 to be stored in the first parasitic capacitor Cp1 associated with the drain electrode of the third transistor M2.

In next a second sampling period between t3 and t5, the reset signal is raised again to high level to turn on the reset transistor M0. The voltage at the receiving electrode Re induced by the ultrasonic echo signal is cleaned with a low voltage setting of the bias voltage Vbias in a first part of the period between t3 and t4. Then, the bias voltage Vbias is pulled up again in a second part of the period between t3 and t4, to a same level equal to that set in the first sampling period.

After a short delay, the bias voltage Vbias is lowered again at t4 to a same level to make the control terminal of the first transistor M1 to be biased properly during the period between t2 and t3. Now, the first control signal Vb and the third control signal S2 are raised to an effective turn-on voltage during the period between t4 and t5. The second transistor M1' is turned on by the first control signal Vb to establish a voltage level at the middle-stage port A which is determined by the bias status of the first transistor M1. Since the fourth transistor M3 is turned on by setting the third control signal S2 to an effective high level, the voltage level at the middle-stage port A is passed as a second sampling voltage through the fourth transistor M3 to be stored in the second parasitic capacitor Cp2 associated with the drain electrode of the fourth transistor M3. Because the voltage induced by the ultrasonic echo signal has been cleaned in this period, the second sampling voltage stored in the second parasitic capacitor Cp2 is only related to a circuit-reference voltage depended on circuit temperature drift, timing drift, thin-film transistor parameters, and TFT process variations. This circuit-reference voltage varies at different locations on a same thin-film transistor substrate due to process variation especially for relatively large sized sensor array implemented for correspondingly large sized display panel.

In the last period, the transmission period between t5 and t6, the fourth control signal S3 is set to an effective high level to allow both the fifth transistor M4 and the sixth transistor M6 to be turned on. The first sampling voltage stored in the first parasitic capacitor Cp1 is outputted to a first output port V1 and the second sampling voltage stored in the second parasitic capacitor Cp2 is outputted to a second output port V2.

In an embodiment, the first output port V1 and the second output port V2 of the sensor circuit (see FIG. 2) is configured to be just two input ports of an operation amplifier (Op Amp) configured to output a voltage signal that just is dependent on a difference between the first sampling voltage and the second sampling voltage at the two input ports. The differential signal effectively eliminates those variable or uncertain factors represented by the circuit-reference voltage and yields substantially a sensing voltage signal Vo depended upon only the strength of the ultrasonic echo signal. The sensing voltage signal Vo is amplified by the Op Amp to complete a sensing process. In a specific embodiment, this sensing voltage signal is fed into a pixel circuit as an image signal for this particular pixel associated with the sensor circuit described herein.

Figure 4:
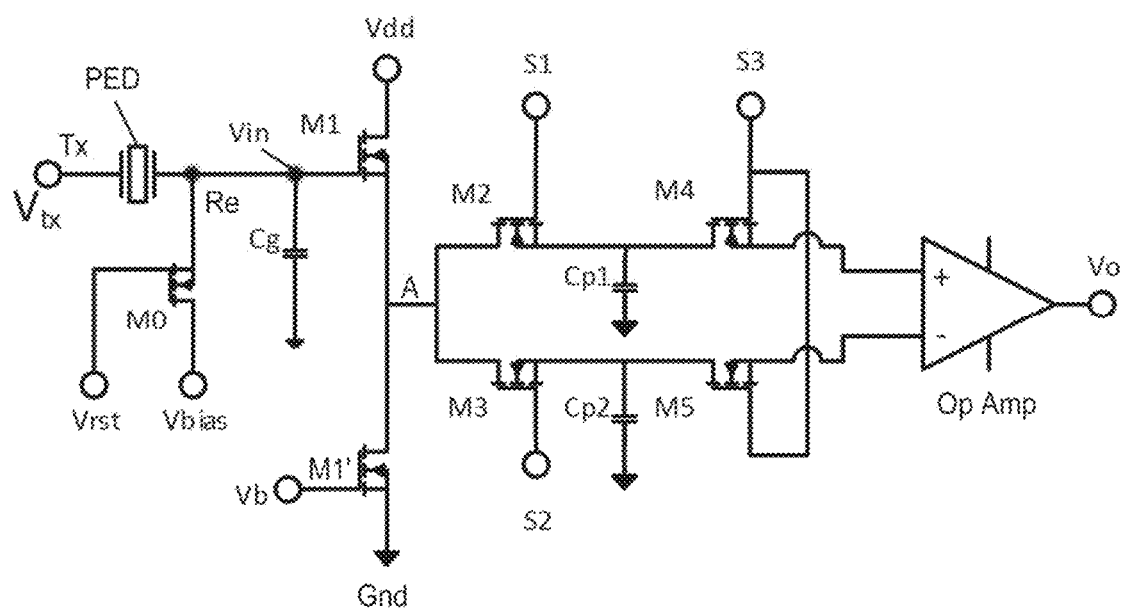
FIG. 4 is a circuit diagram of a sensor circuit for generating and detecting ultrasonic sensing signal according to an alternative embodiment of the present disclosure.
Figure 5:
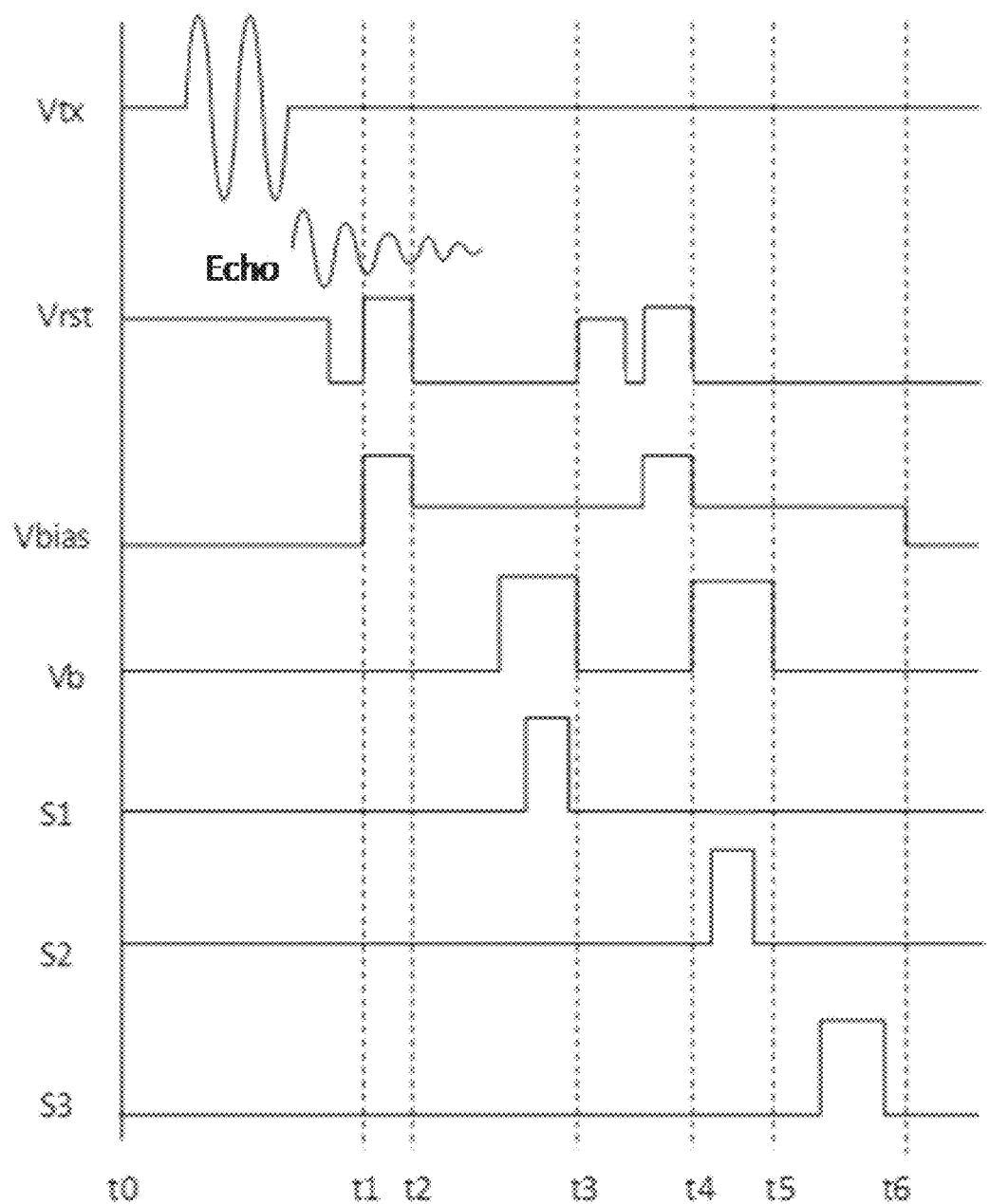
FIG. 5 is a timing diagram of operating the sensor circuit of FIG. 4 to detect an ultrasonic sensing signal according to an embodiment of the present disclosure.

In an alternative embodiment, as shown in FIG. 4, the sensor circuit for generating and detecting ultrasonic sensing signal includes a biasing-and-sampling sub-circuit containing just one reset transistor M0 with its gate or control terminal coupled to the reset terminal to receive a reset control signal Vrst and a first terminal coupled to the receiving electrode Re and a second terminal coupled to the bias voltage terminal applied with the bias voltage Vbias. Unlike the sensor circuit shown in FIG. 2, this sensor circuit does not have the diode device between the bias voltage terminal and the receiving electrode Re. In fact, the reset transistor M0, an N-type transistor, can be functioned the same as a diode when applying a substantially same voltage level to both the gate terminal (i.e., the reset terminal) and the drain terminal (i.e., the bias voltage terminal). FIG. 5 shows a timing diagram of operating the sensor circuit of FIG. 4 to detect an ultrasonic sensing signal according to an embodiment of the present disclosure. Referring to FIG. 5, in the period t1~t2, i.e., a first sampling period, both the Vrst and Vbias are set to a same level or at least with a difference smaller than a threshold voltage Vth of the reset transistor M0, making it working in a diode mode to effectively support the collection of the first sampling voltage that is related to an ultrasonic echo signal plus a circuit-reference voltage, just like that described earlier based on the sensor circuit shown in FIG. 2 and the timing diagram shown in FIG. 3. Further in the period of t3~t4, when the bias voltage Vbias is pulled higher, the reset signal is also pulled to a same high voltage level to accomplish the collection of the second sampling voltage that is related only to a circuit-reference voltage. Again, when both the first sampling voltage and the second sampling voltage are outputted to two input ports of an Op Amp, the sensing voltage signal Vo can be accurately determined, eliminating noises from the TFT circuit.

Figure 6:
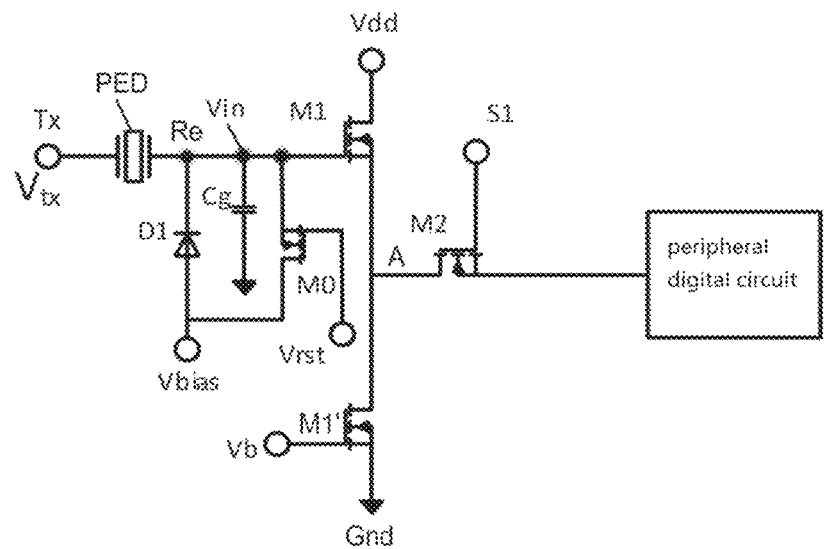
FIG. 6 is a circuit diagram of a sensor circuit for generating and detecting ultrasonic sensing signal according to another embodiment of the present disclosure.
Figure 7:
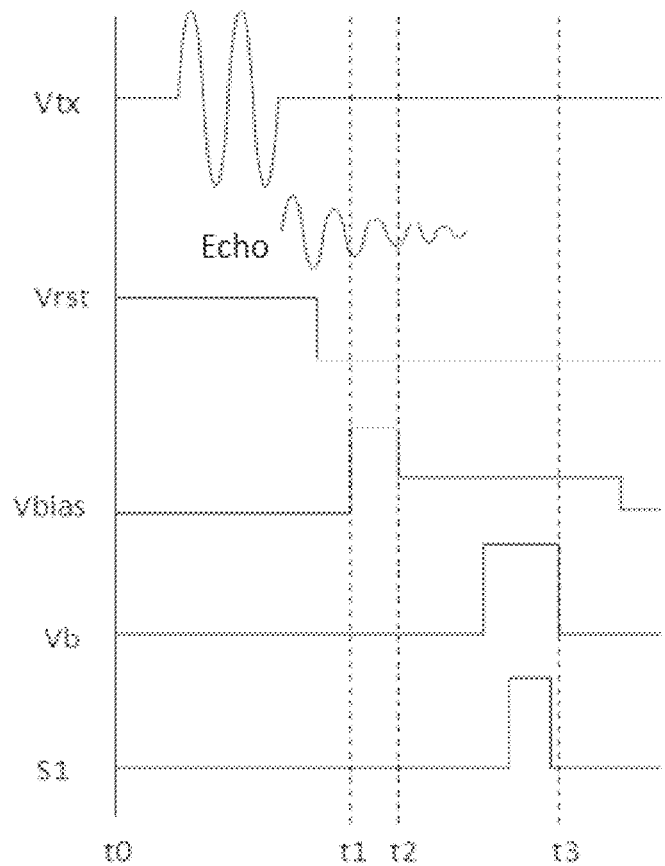
FIG. 7 is a timing diagram of operating the sensor circuit of FIG. 6 to detect an ultrasonic sensing signal according to an embodiment of the present disclosure.

In yet another embodiment, as shown in FIG. 6, the sensor circuit can be provided with a simplification of the signal-collection sub-circuit by eliminating the fourth transistor M3 of FIG. 2 with other part of the circuit structure being kept the same. In this embodiment, collection of the first sampling voltage and the second sampling voltage still are performed in separate timings. As a timing diagram shown in FIG. 7, in the period of t1~t2, the bias voltage Vbias is set to high during an ultrasonic echo signal reception time associated with the sensor circuit of FIG. 6. With a short delay, the bias voltage Vbias is then turned lower to perform a voltage sampling to collect a first sampling voltage related to the ultrasonic echo signal plus a circuit-reference voltage. During the period of t2~t3, both the first control signal Vb and the second control signal S1 are set high to allow the first sampling voltage to be passed to a peripheral digital circuit. The peripheral digital circuit is configured with a non-volatile memory device to save the first sampling voltage. In a subsequently later period with the ultrasonic echo signal being substantially decayed, a similar operation on setting the bias voltage Vbias can be performed. Though FIG. 7 did not show the repeated operation timing control, the second sampling voltage can be deduced similarly and delivered to the peripheral digital circuit. The peripheral digital circuit then is able to perform digital data subtraction to eliminate effect of the circuit-reference voltage to obtain a true sensing signal related only to the ultrasonic echo signal. All the signal storage and data process can be performed fully within the peripheral digital circuit.

Figure 8:
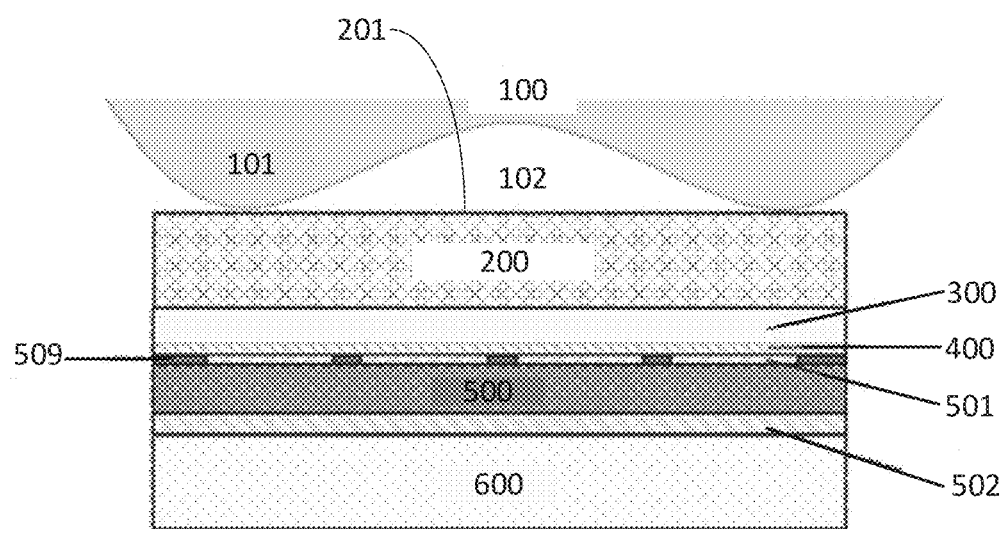
FIG. 8 is a schematic cross-sectional view of an array of functional ultrasonic piezoelectric-based fingerprint sensors implemented in a display panel according to an embodiment of the present disclosure.

In an alternative aspect, the present disclosure provides a sensing display apparatus configured with array of piezoelectric sensors respectively associated with array pixel circuits. In particular, each piezoelectric sensor is provided with both ultrasonic transmission and receiving functions in one sensor structure. In an example, the sensing display apparatus is developed as a fingerprint image apparatus. FIG. 8 is a schematic cross-sectional view of an array of functional ultrasonic piezoelectric-based fingerprint sensors implemented in a display panel according to an embodiment of the present disclosure. Referring to FIG. 8, the array sensors is adopted in thin-film configurations integrated with a thin-film transistor-based array of pixel circuits in a multi-layered structure of a display panel.

FIG. 8 only shows partially the thin-film structure associated with the array of sensors. Layer 600 is a protection layer primarily made by electrical insulation material with proper mechanical properties suitable for ultrasonic application. On one side of the protection layer 600, a common electrode layer 502 is attached, which is configured to a transmitting electrode Tx for all piezoelectric sensor in the array. Optionally, the common electrode layer 502 is made by silver, though other conductive materials can be used.

On one side of the common electrode layer 502 farther from the protection layer 600, a piezoelectric functional layer 500 is laid. Optionally, the piezoelectric functional layer 500 includes a polymer film containing polyvinylidene fluoride (PVDF). Other piezoelectric material may be used to replace PVDF depending on applications.

On one side of the piezoelectric functional layer 500 farther from the common electrode layer 502, an array of receiving electrodes 501 is formed as a thin film patch configured to have one receiving electrode Re per one sensor to match a pattern of the array of the sensors. Every receiving electrode 501 per sensor is isolated from its neighbors by an insulation isolation layer 509 so that each sensor is independently bias-controlled to transmit and receive ultrasonic signals. Optionally, the receiving electrodes 501 are made by a conductive material that is optically transparent. Optionally, an indium tin oxide material is used.

On the array of receiving electrodes 501, a thin-film-transistor (TFT)-based pixel circuit layer 400 is laid. The TFT-based pixel circuit layer 400 at least includes all thin-film transistors shown in the sensor circuit of FIG. 2 and beyond including other transistors or capacitors, diodes, etc. used in typical thin-film transistor display apparatus. Referring to FIG. 8, on the TFT-based pixel circuit layer 400, a TFT base substrate 300 is attached. On the TFT base substrate 300, optionally, there can be included with other functional layers or passivation layers or cover glass 200.

Referring to FIG. 8, the sensing display apparatus is applicable as a fingerprint imager. FIG. 8 shows a finger 100 touches the cover glass 200 forming an interface 201 between finger surface and top surface of the cover glass. The finger surface includes fingerprint ridges 101 which form a direct contact with the cover glass 200 and fingerprint valleys 102 which have an extra air gap between the finger 100 and the top surface of the cover glass. Thus, the interface 201 across the sensing display apparatus has different characteristics for locations associated with fingerprint ridges 101 versus locations associated with fingerprint valleys 102. As the sensing display apparatus is operated to take fingerprint image, an AC excitation pulse(s) is applied to the common electrode layer 502 and each receiving electrode 501 is properly and independently biased so that they can generate ultrasonic signals. The ultrasonic signal is a sound wave traveling through the multi-layered structure and reflected with an ultrasonic echo signal from the interface between the finger 100 and top surface of the cover glass 200. If the ultrasonic signal directly is reflected from locations associated with fingerprint ridges, the total reflection of the ultrasonic wave is relatively strong. If the ultrasonic signal is reflected from locations associated with fingerprint valleys having extra air gaps, the total reflection of the ultrasonic wave is relatively weak. This spatial variation of the ultrasonic echo signals is spatially correlated to a spatial distribution of the array of sensors. In other words, some sensors in the array detect relatively weak ultrasonic echo signals, suggesting that the corresponding regions are parts of fingerprint valleys. While other sensors in the array detect relatively strong ultrasonic echo signals, suggesting that the corresponding regions are parts of fingerprint ridges. Therefore, through the array of sensors implemented across the display panel in relatively large size and proper pixel density, a full image of fingerprint image can be produced. Note, the embodiments of each sensor circuit and its functions to generate and detect ultrasonic signals have been described in the specification through FIG. 1 to FIG. 7, in which each sensor circuit is able to obtain a first sampling voltage related to the ultrasonic echo signal plus some circuit reference signals and a second sampling voltage related only to the circuit reference signals and a differential amplification leads to accurate detection of a sensing signal related only to the ultrasonic echo signal that is used for generating a pixel of a fingerprint image.

Figure 9:
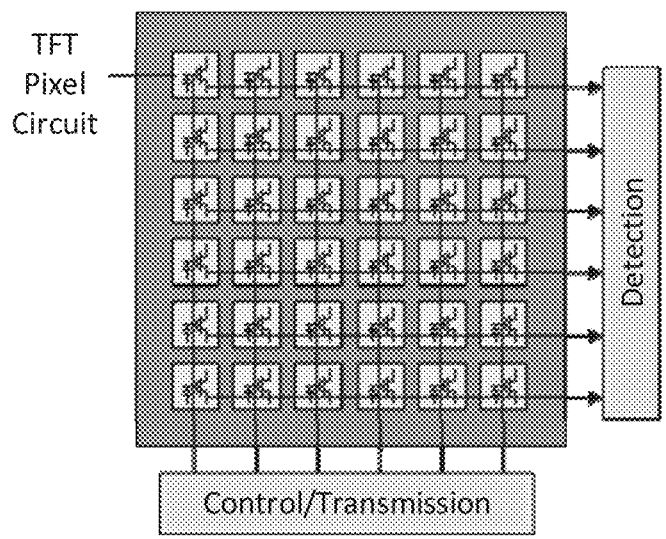
FIG. 9 is a schematic top view of an array of sensors implemented with thin-film transistor-based pixel circuits in a display panel according to an embodiment of the present disclosure.

FIG. 9 is a schematic top view of an array of sensors implemented with thin-film transistor-based pixel circuits in a display panel according to an embodiment of the present disclosure. Optionally, the array of the ultrasonic sensing signal detection circuits includes array of piezoelectric devices made by one polymer film containing polyvinylidene fluoride extended across entire substrate with a common transmitting electrode made by a silver layer and array of individual receiving electrodes made by indium tin oxide separated by an insulation material. Optionally, a control-and-transmission circuit configured to provide one or more AC excitation voltage pulses in a frequency of 5~30 MHz, and one or more bias voltages, and one or more control signals (Referring to FIG. 2 and FIG. 3). Optionally, the one or more AC excitation voltage pulses are applied to the common transmitting electrode across the display panel and the one or more bias voltages are provided to a respective one of the array of individual receiving electrodes of a respective one of the array of piezoelectric devices under control of the one or more control signals. Each of the array of the ultrasonic sensing signal detection circuits is configured to independently generate and transmit a respective ultrasonic signal, and to detect a ultrasonic echo signal reflected by an object touched on the top screen (or cover glass).

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A circuit for generating and detecting ultrasonic sensing signals comprising:
    a piezoelectric device having a transmitting electrode and a receiving electrode;
    a biasing-and-sampling sub-circuit configured to set different bias voltages to the receiving electrode, wherein the piezoelectric device is configured to transmit an ultrasonic signal upon applying an exciting pulse signal to the transmitting electrode or to generate a voltage signal at the receiving electrode upon receiving an ultrasonic echo signal based on the ultrasonic signal;
    a signal-collecting sub-circuit coupled to the receiving electrode to determine a first sampling voltage based on the voltage signal at the receiving electrode in a first sampling period to be passed out under control of a first control signal and a second control signal and determine a second sampling voltage based on the voltage signal at the receiving electrode in a second sampling period to be passed out under control of the first control signal and a third control signal; and
    an output sub-circuit coupled to the signal-collecting sub-circuit for outputting the first sampling voltage and the second sampling voltage at a same time.

2. The circuit of claim 1, wherein the biasing-and-sampling sub-circuit comprises a diode having a first terminal coupled to the receiving electrode and a second terminal coupled to a bias-voltage terminal; and
    a reset transistor having a control terminal coupled to a reset terminal, a first terminal coupled to the receiving electrode, and a second terminal coupled to the bias-voltage terminal, the reset terminal being provided with a reset signal and the bias-voltage terminal being provided with a bias voltage.

3. The circuit of claim 1, wherein the biasing-and-sampling sub-circuit consists of a reset transistor having a control terminal coupled to a reset terminal, a first terminal coupled to the receiving electrode, and a second terminal coupled to the bias-voltage terminal, wherein the reset terminal is provided with a reset signal, the bias-voltage terminal is provided with a bias voltage, the reset signal being substantially equal in value with the bias voltage in at least the first sampling period and the second sampling period.

4. The circuit of claim 1, wherein the signal-collecting sub-circuit comprises a first transistor having a control terminal coupled to the receiving electrode carrying the voltage signal, a first terminal coupled to a middle-stage port, and a second terminal coupled to a power supply port;
    a second transistor having a control terminal configured to receive the first control signal, a first terminal coupled to a ground port, and a second terminal coupled to the middle-stage port;
    a third transistor having a control terminal configured to receive a second control signal, a first terminal including a first parasitic capacitor, and a second terminal coupled to middle-stage port; and
    a fourth transistor having a control terminal configured to receive the third control signal, a first terminal including a second parasitic capacitor, and a second terminal coupled to the middle-stage port.

5. The circuit of claim 4, wherein the first transistor is biased by the voltage signal generated at the receiving electrode and stored in a parasitic capacitor connected to the receiving electrode, wherein the voltage signal is related to the ultrasonic echo signal with detectable strength in the first sampling period and the ultrasonic echo signal substantially decayed in the second sampling period; the second transistor and the third transistor are turned on together respectively by the first control signal and the second control signal in the first sampling period for passing the first sampling voltage related to the ultrasonic echo signal and a circuit-reference signal through the middle-stage port to the first parasitic capacitor; the second transistor and the fourth transistor are turned on together respectively by the first control signal and the third control signal in the second sampling period for passing the second sampling voltage related only to the circuit-reference signal through the middle-stage port to the second parasitic capacitor.

6. The circuit of claim 5, wherein the output sub-circuit comprises a fifth transistor and a sixth transistor having a common control terminal configured to receive a fourth control signal, the fifth transistor having a drain terminal coupled to the first parasitic capacitor and the sixth transistor having a drain terminal coupled to the second parasitic capacitor and being configured under control of the fourth control signal to output the first sampling voltage from the first parasitic capacitor to a source terminal of the fifth transistor and at a same time to output the second sampling voltage from the second parasitic capacitor to a source terminal of the sixth transistor.

7. The circuit of claim 6, wherein each of the first, second, third, fourth, fifth, and sixth transistor is an N-type transistor.

8. The circuit of claim 1, wherein the piezoelectric device comprises a piezoelectric material selected from a polymer film containing polyvinylidene fluoride, a piezoelectric ceramic containing lithium niobate, gallium arsenide, zinc oxide, aluminum nitride and lead zirconate-titanate (PZT), an electromechanical film containing thin polypropylene material.

9. The circuit of claim 1, wherein the receiving electrode comprises a thin film block made by indium tin oxide.

10. The circuit of claim 7, further comprising an operational amplifier configured to receive the first sampling voltage and the second sampling voltage as a differential signal to output a sensing voltage signal related to the ultrasonic echo signal yet independent of the circuit-reference signal.

11. An ultrasonic sensing signal detection circuit for generating an ultrasonic sensing pixel image comprising:
- a piezoelectric device having a transmitting electrode and a receiving electrode;
- a biasing-and-sampling sub-circuit configured to set different bias voltages to the receiving electrode respectively for the piezoelectric device to transmit an ultrasonic signal upon applying an exciting pulse signal to the transmitting electrode or to generate a voltage signal at the receiving electrode upon receiving an ultrasonic echo signal based on the ultrasonic signal;
- a signal-collecting sub-circuit coupled to the receiving electrode to determine a first sampling voltage based on the voltage signal at the receiving electrode to be passed out under control of a first control signal and a second control signal in a first sampling period and determine a second sampling voltage based on the voltage signal at the receiving electrode to be passed out under control of the first control signal and the second control signal in a second sampling period; and
- a peripheral digital circuit configured to deduce the ultrasonic echo signal received by based on a differential signal between a first digital signal converted from the first sampling voltage and a second digital signal converted from the second sampling voltage.

12. The ultrasonic sensing signal detection circuit of claim 11, wherein the biasing-and-sampling sub-circuit comprises a diode having a first terminal coupled to the receiving electrode and a second terminal coupled to a bias-voltage terminal; and
- a reset transistor having a control terminal coupled to a reset terminal, a first terminal coupled to the receiving electrode, and a second terminal coupled to the bias-voltage terminal, the reset terminal being provided with a reset signal and the bias-voltage terminal being provided with a bias voltage.

13. The ultrasonic sensing signal detection circuit of claim 11, wherein the signal-collecting sub-circuit comprises a first transistor having a control terminal coupled to the receiving electrode carrying the voltage signal, a first terminal coupled to a middle-stage port, and a second terminal coupled to a power supply port;
- a second transistor having a control terminal configured to receive the first control signal, a first terminal coupled to a ground port, and a second terminal coupled to the middle-stage port; and
- a third transistor having a control terminal configured to receive a second control signal, a first terminal being an output port, and a second terminal coupled to the middle-stage port.

14. The ultrasonic sensing signal detection circuit of claim 13, wherein the first transistor is biased by the voltage signal generated at the receiving electrode and stored in a parasitic capacitor connected to the receiving electrode, wherein the voltage signal is related to the ultrasonic echo signal with detectable strength in the first sampling period and the ultrasonic echo signal substantially decayed in the second sampling period; the second transistor and the third transistor are turned on together respectively by the first control signal and the second control signal in the first sampling period for passing the first sampling voltage related to the ultrasonic echo signal and a circuit-reference signal through the middle-stage port to the output port and in the second sampling period for passing the second sampling voltage related only to the circuit-reference signal through the middle-stage port to the output port.

15. The ultrasonic sensing signal detection circuit of claim 13, wherein the peripheral digital circuit comprises an analog-to-digital converter configured to convert the first sampling voltage to the first digital signal and convert the second sampling voltage to a second digital signal, comprises a non-volatile memory to store the first digital signal and the second digital signal, and comprises a processor to deduce a pixel data signal corresponding to the ultrasonic echo signal based on a differential signal between the first digital signal and the second digital signal.

16. The ultrasonic sensing signal detection circuit of claim 15, wherein the peripheral digital circuit is coupled to a pixel circuit, wherein the pixel data signal is inputted for driving the pixel circuit to display a pixel image.

17. The ultrasonic sensing signal detection circuit of claim 11, wherein the piezoelectric device is configured to transmit an ultrasonic signal upon receiving an exciting pulse signal at the transmitting electrode with one or more voltage pulses in a frequency of 5-30 MHz.

18. A sensing display apparatus comprising a display panel having a top screen over a glass substrate including an array of pixel circuits, a respective one of the array of pixel circuits being coupled to a respective one of an array of ultrasonic sensing signal detection circuits of claim 11.

19. The sensing display apparatus of claim 18, wherein the array of the ultrasonic sensing signal detection circuits includes array of piezoelectric devices made by one polymer film containing polyvinylidene fluoride extended across entire substrate with a common transmitting electrode made by a silver layer and array of individual receiving electrodes made by indium tin oxide separated by an insulation material.

20. The sensing display apparatus of claim 19, further comprising a control-and-transmission circuit configured to provide one or more excitation voltage pulses in a frequency of 5~30 MHz, one or more bias voltages, and one or more control signals, the one or more excitation voltage pulses being applied to the common transmitting electrode and the one or more bias voltages being provided to a respective one of the array of individual receiving electrodes of a respective one of the array of piezoelectric devices under control of the one or more control signals, to generate and transmit a respective ultrasonic signal, and to detect a ultrasonic echo signal reflected by an object touched on the top screen.

* * * * *